Patented Feb. 7, 1933

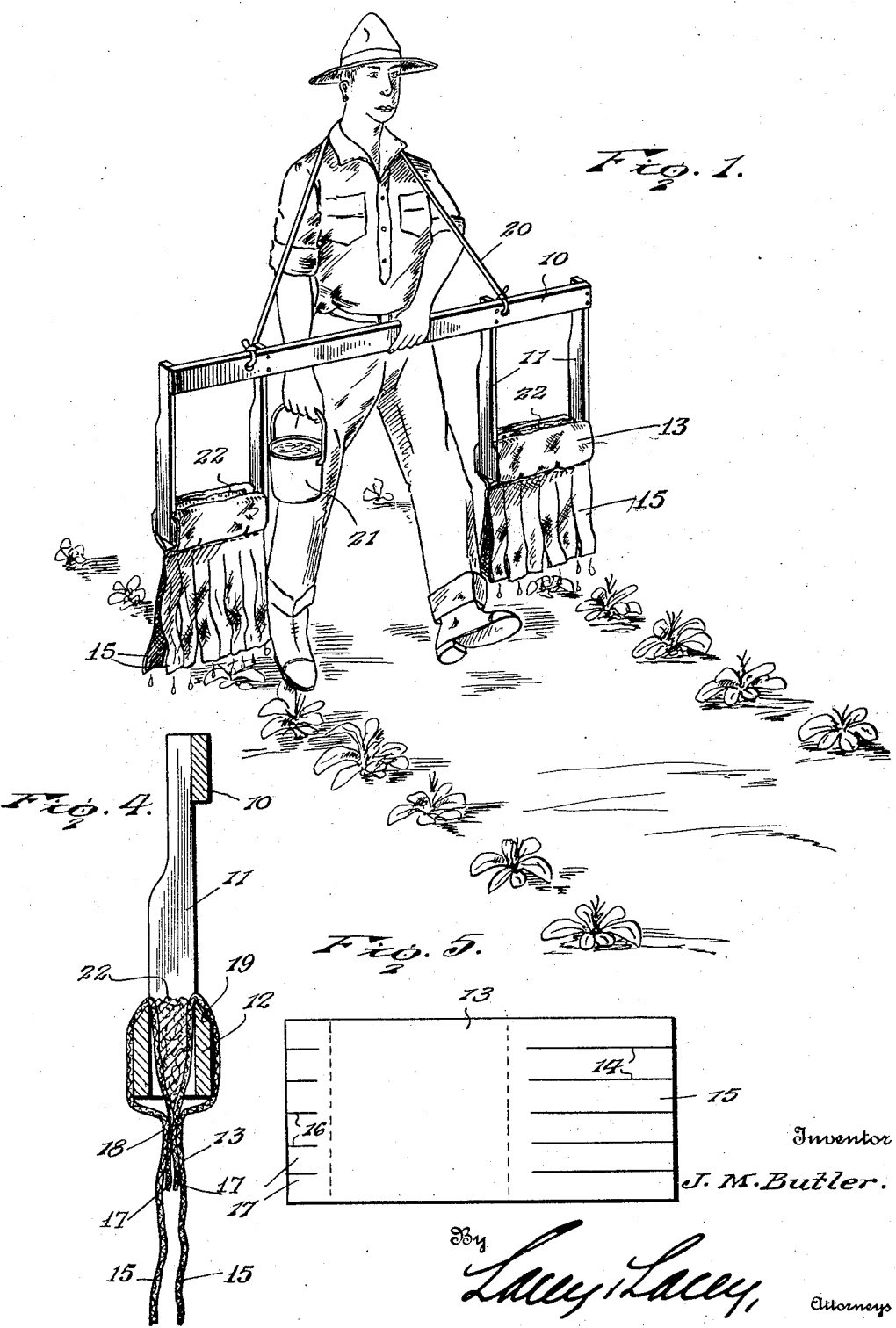

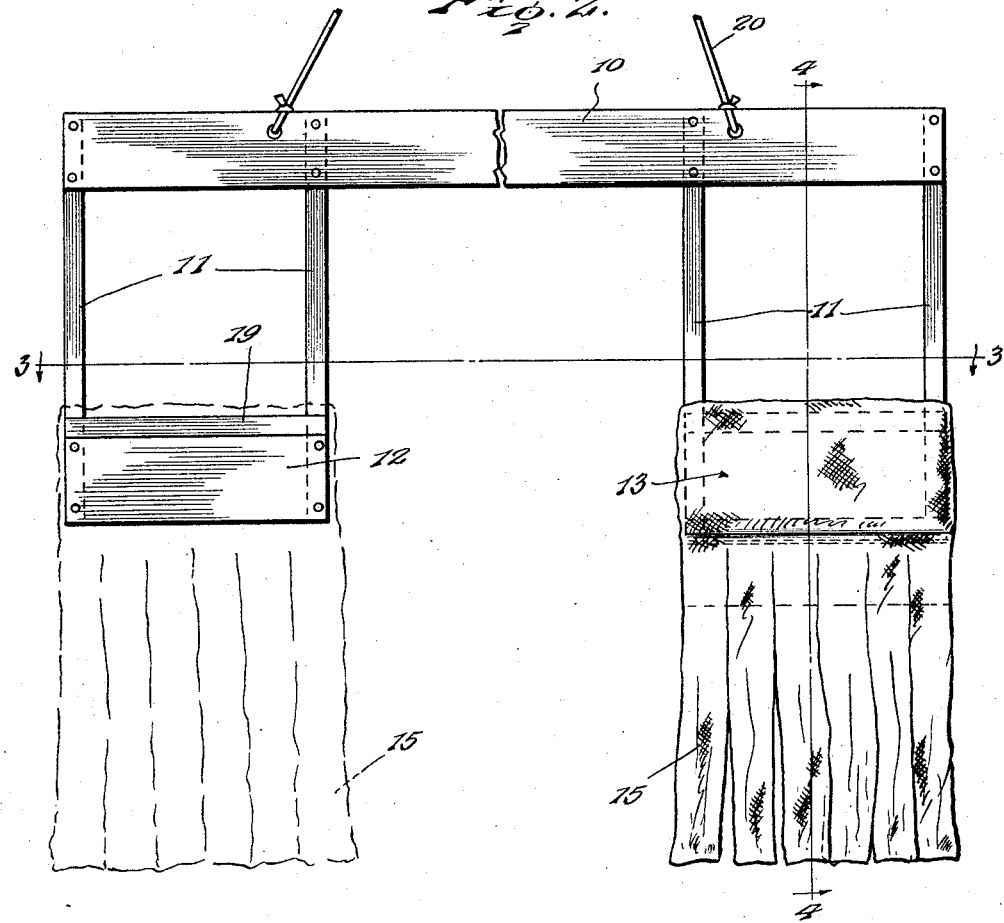
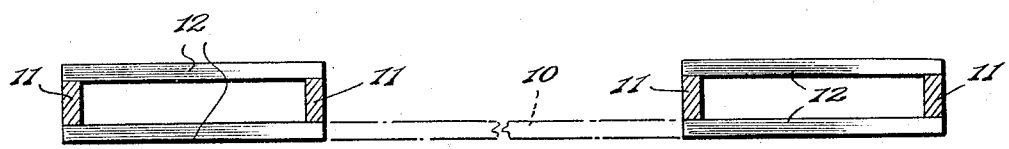

1,896,882

UNITED STATES PATENT OFFICE

JAMES M. BUTLER, OF BLANEY, SOUTH CAROLINA

POISON SPREADER

Application filed August 22, 1931. Serial No. 558,787.

This invention relates to poison spreaders and has for an object to provide an extremely simple and inexpensive device that may be carried upon the shoulders and will simultaneously drip poison liquid on two rows of cotton or other plants as the operator walks between the rows.

A further object of the invention is to provide a yoke having spaced containers from which fabric brushes hang downwardly and wipe the tops of the plants, poison liquid being supplied to the brushes to keep the brushes dripping on the plants, as the operator walks along between the rows.

A further object is to provide a light, strong and durable poison spreader which will permit of one man effectively operating over a great area of plants in minimum time and more effectively spraying the plants than hitherto possible with the ordinary mop commonly used for destroying plant pests, especially boll weevil.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings, forming part of this specification,

Figure 1 is a perspective view of the poison sprayer in operation,

Fig. 2 is a front elevation of the sprayer, with one of the brushes broken away from its container to expose the framework, Fig. 3 is a cross section taken on the line 3—3 of Fig. 2, Fig. 4 is a vertical view taken on the line 4—4 of Fig. 2, and Fig. 5 is a plan view of one of the brushes, reduced in size, prior to application to its container.

Referring now to the drawings in which like characters of reference designate similar parts in the various views, the poison spreader is shown to comprise a yoke 10 which may be formed from a single bar of wood to each end of which is nailed or otherwise secured a pair of downwardly extending slats 11.

To the edges of the lower ends of each pair of slats a pair of boards 12 are nailed or otherwise secured and coact with the slats in forming a container at each end of the yoke.

Each container is equipped with brushes 13, each preferably formed from a single blank of fabric, best shown in Fig. 5, the fabric being provided with long parallel slits 14 at one end to divide the material into long tabs 15. The opposite end of the blank may be provided with a plurality of short longitudinal slits 16 to provide short tabs 17.

A pair of the fabric brushes are looped over the top edges of the boards 12 of each container, as best shown in Fig. 4, so that the short tabs 17 of both brushes register with each other and with the long tabs 15. A line of stitching 18 is then passed through both brushes, just above the short tabs, to bind the brushes together. It will be observed that both brushes converge from the upper edges of the boards 12, which upper edges are beveled, as shown at 19, to the line of stitching 18 to form a trough. Consequently, poison liquid may be poured into the fabric troughs in the containers and allowed to soak downwardly through the long tabs 15 from which it drips as the operator carries the device along, as shown in Fig. 1. The material from which the brushes are formed may be coarse fabric bagging or sheeting.

A cord 20 is attached at the ends to the yoke 10 and may be directed over the operator's shoulders and back of his neck to suspend the yoke at such a height from the ground that the tabs 15 of the brushes will wipe the tops of the plants as the operator passes along between the rows. The cord may be lengthened or shortened to adjust the device to various heights of plants.

The operator carries a pail 21 from which he pours the poison liquid into the containers from time to time. Preferably, the poison liquid is of the usual and well-known type comprising a solution of molasses, water, and calcium arsenite. This solution is rather thick and will not pass through the brushes as quickly as water but has sufficient fluidity to readily drip from the brushes to the plants.

To provide for an adequate supply of poison liquid in the containers, each container is preferably provided with a sponge upon which the liquid is poured, the sponge preferably comprising rags 22 which fill the V-shaped trough portions of the cloth brushes in the containers, as best shown in Fig. 4.

From the above description, it is thought that the construction and operation of my invention will be thoroughly understood without further explanation.

Having thus described the invention, I claim:

1. A poison spreader comprising a yoke, spaced slats depending from the ends of the yoke, boards connecting the lower ends of each pair of slats and forming containers open at the top and bottom, a pair of fabric brushes having tabs hanging downwardly from the bottom of each container and having portions looped over the boards of each container and converging from the upper edges of the boards to form fabric troughs, and a line of stitching passed through each pair of brushes below the respective container.

2. A poison spreader comprising spaced containers open at the bottom and at the top, means for suspending the containers from the operator's shoulders to overhang spaced rows of plants, fabric brushes hanging downwardly from each container and having converging portions in the containers forming fabric troughs, and sponges in the troughs.

In testimony whereof I affix my signature.

JAMES M. BUTLER. [L. S.]